United States Patent
Pasquero et al.

(10) Patent No.: US 8,855,705 B2
(45) Date of Patent: Oct. 7, 2014

(54) ELECTRONIC DEVICE INCLUDING ACTUATOR FOR PROVIDING TACTILE OUTPUT

(75) Inventors: Jerome Pasquero, Kitchener (CA); Steven Henry Fyke, Waterloo (CA); Scott James Stobbe, Kitchener (CA)

(73) Assignee: BlackBerry Limited, Waterloo (CA)

( * ) Notice: Subject to any disclaimer, the term of this patent is extended or adjusted under 35 U.S.C. 154(b) by 177 days.

(21) Appl. No.: 12/851,282

(22) Filed: Aug. 5, 2010

(65) Prior Publication Data

US 2012/0032892 A1 Feb. 9, 2012

(51) Int. Cl.
*H04M 1/00* (2006.01)
*G06F 3/044* (2006.01)
*G06F 3/01* (2006.01)

(52) U.S. Cl.
CPC ........... *G06F 3/016* (2013.01); *G06F 3/044* (2013.01)
USPC ........ 455/550.1; 455/566; 455/899; 455/433; 455/412.1; 455/412.2; 455/41.2; 455/556.3; 455/567

(58) Field of Classification Search
USPC ............... 345/173, 163; 455/550.1, 566, 899, 455/433.07, 412.1, 412.2, 41.2, 556, 3.05, 455/11.1, 567, 41.1
See application file for complete search history.

(56) References Cited

U.S. PATENT DOCUMENTS

| | | | |
|---|---|---|---|
| 4,044,350 A | 8/1977 | Tretiakoff et al. | |
| 7,016,707 B2 | 3/2006 | Fujisawa et al. | |
| 7,130,664 B1 | 10/2006 | Williams | |
| 7,155,241 B2 | 12/2006 | Helferich | |
| 7,289,315 B2 * | 10/2007 | Hillman et al. | 361/679.55 |
| 7,835,757 B2 | 11/2010 | Helferich | |
| 7,880,729 B2 * | 2/2011 | Lynch et al. | 345/173 |
| 8,077,019 B2 | 12/2011 | Hofmann et al. | |
| 8,131,275 B2 | 3/2012 | Kwak et al. | |
| 8,180,296 B2 | 5/2012 | Flaherty | |
| 8,315,652 B2 | 11/2012 | Grant et al. | |
| 8,519,834 B2 * | 8/2013 | Jersa et al. | 340/407.1 |
| 2002/0112914 A1 * | 8/2002 | Abe et al. | 181/166 |
| 2002/0121966 A1 | 9/2002 | Woodard et al. | |
| 2003/0038729 A1 | 2/2003 | Dunsmore et al. | |
| 2003/0151982 A1 | 8/2003 | Brewer et al. | |

(Continued)

FOREIGN PATENT DOCUMENTS

| | | |
|---|---|---|
| DE | 102008056751 | 5/2010 |
| JP | 59171881 | 9/1984 |

(Continued)

OTHER PUBLICATIONS

Wang, Q. et al., "Biomechanically Optimized Distributed Tactile Transducer Based on Lateral Skin Deformation" Haptics Laboratory, Center for Intelligent Machines, McGill University, Montreal, Canada, published at least as early as Apr. 2010.

(Continued)

*Primary Examiner* — Joseph Arevalo
(74) *Attorney, Agent, or Firm* — Geoffrey deKleine; Borden Ladner Gervais LLP

(57) ABSTRACT

An electronic device includes a base, a membrane coupled to and spaced from the base, an actuator disposed between the base and the membrane, and spaced from the membrane when the actuator is not actuated, and a controller configured to control actuation of the actuator to cause the actuator to contact the membrane.

14 Claims, 5 Drawing Sheets

(56) References Cited

U.S. PATENT DOCUMENTS

| | | | |
|---|---|---|---|
| 2004/0201317 A1 | 10/2004 | Wong | |
| 2005/0133347 A1 | 6/2005 | Hein | |
| 2005/0152325 A1 | 7/2005 | Gonzales | |
| 2006/0092177 A1 | 5/2006 | Blasko | |
| 2007/0052691 A1* | 3/2007 | Zadesky et al. | 345/173 |
| 2007/0057913 A1 | 3/2007 | Eid et al. | |
| 2007/0125636 A1* | 6/2007 | Karan et al. | 200/521 |
| 2007/0236450 A1 | 10/2007 | Colgate et al. | |
| 2007/0265800 A1* | 11/2007 | Sugai | 702/160 |
| 2008/0062143 A1 | 3/2008 | Shahoian et al. | |
| 2008/0100177 A1 | 5/2008 | Dai et al. | |
| 2008/0192976 A1* | 8/2008 | Kim | 381/412 |
| 2008/0238879 A1* | 10/2008 | Jaeger et al. | 345/173 |
| 2009/0072955 A1 | 3/2009 | Cary | |
| 2009/0074224 A1* | 3/2009 | Wright | 381/385 |
| 2009/0115734 A1 | 5/2009 | Fredriksson et al. | |
| 2009/0180646 A1* | 7/2009 | Vulfson et al. | 381/151 |
| 2009/0313542 A1 | 12/2009 | Cruz-Hernandez et al. | |
| 2010/0086151 A1* | 4/2010 | Ruiter | 381/190 |
| 2010/0312521 A1* | 12/2010 | Sugai | 702/160 |
| 2011/0210834 A1 | 9/2011 | Pasquero et al. | |
| 2012/0044062 A1* | 2/2012 | Jersa et al. | 340/407.1 |
| 2012/0087523 A1* | 4/2012 | Gerkinsmeyer | 381/190 |

FOREIGN PATENT DOCUMENTS

| | | |
|---|---|---|
| JP | 5288868 | 11/1993 |
| JP | 7218663 | 8/1995 |
| WO | 2004/053830 A1 | 6/2004 |
| WO | 2007066262 A1 | 6/2007 |

OTHER PUBLICATIONS http://www.touchuserinterface.com/2009/04/touch-screens-and-vision-impaired.html, published at least as early as Apr. 1, 2009.

http://www.newscientist.com/article/mg20127015.700-vibrating-touch-screen-puts-braille-at-the-fingertips.html, published at least as early as Mar. 31, 2009.

www.edn.com/article/459376-Touch_screen_controller_provides_tactile_feedback.phps, published at least as early as Aug. 6, 2009.

www.pacinian.com/file_viewer.php?id=215, published at least as early as Oct. 2009.

http://www.phoenix.tc-ieee.org/004_Piezo_Film_Blood_Flow_Sensor/Phoenix_PiezoPulse.htm, published at least as early as Sep. 19, 2005.

http://www.yankodesign.com/2007/08/07/all-in-one-haptic-phone/, published at least as early as Aug. 2007.

European Patent Application No. 10172092.8, European Search Report dated Jan. 12, 2011.

Blasko et al., "An Interaction System for Watch Computers Using Tactile Guidance and Bidirectional Segmented Strokes", Eighth International Symposium on Wearable Computers, ISWC, Oct. 31-Nov. 4, 2004, pp. 120-123.

Kim et al., "The Gesture Watch: A Wireless Contact-free Gesture based Wrist Interface", 11th IEEE International Symposium on Wearable Computers, Boston, MA, Oct. 11-13, 2007, pp. 15-22.

Lee et al., "Mobile Gesture Interaction Using Wearable Tactile Displays", CHI 2009, Student Research Competition, Boston, MA, Apr. 4-9, 2009, pp. 3437-3442.

Examiner's Report dated Jun. 25, 2013, issued from the corresponding Canadian patent application No. 2,744,717.

Examiner's report dated Feb. 28, 2014 received in corresponding Canadian Application 2,744,717.

Official Action dated Mar. 13, 2014 received in related U.S. Appl. No. 12/884,522.

Office Action dated Feb. 1, 2013, issued from the corresponding EP patent application No. 10172092.8.

\* cited by examiner

ELECTRONIC DEVICE INCLUDING ACTUATOR FOR PROVIDING TACTILE OUTPUT

FIELD OF TECHNOLOGY

The present disclosure relates to an electronic device including an actuator for providing tactile output.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs) in various forms, and peripheral devices for communicating with PDAs.

Devices such as PDAs or smart phones are generally intended for handheld use and ease of portability. Smaller devices are generally desirable for portability. PDA watches or watches that may communicate with PDAs or other electronic devices are desirable for their small overall size and convenience.

Improvements in such electronic devices are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
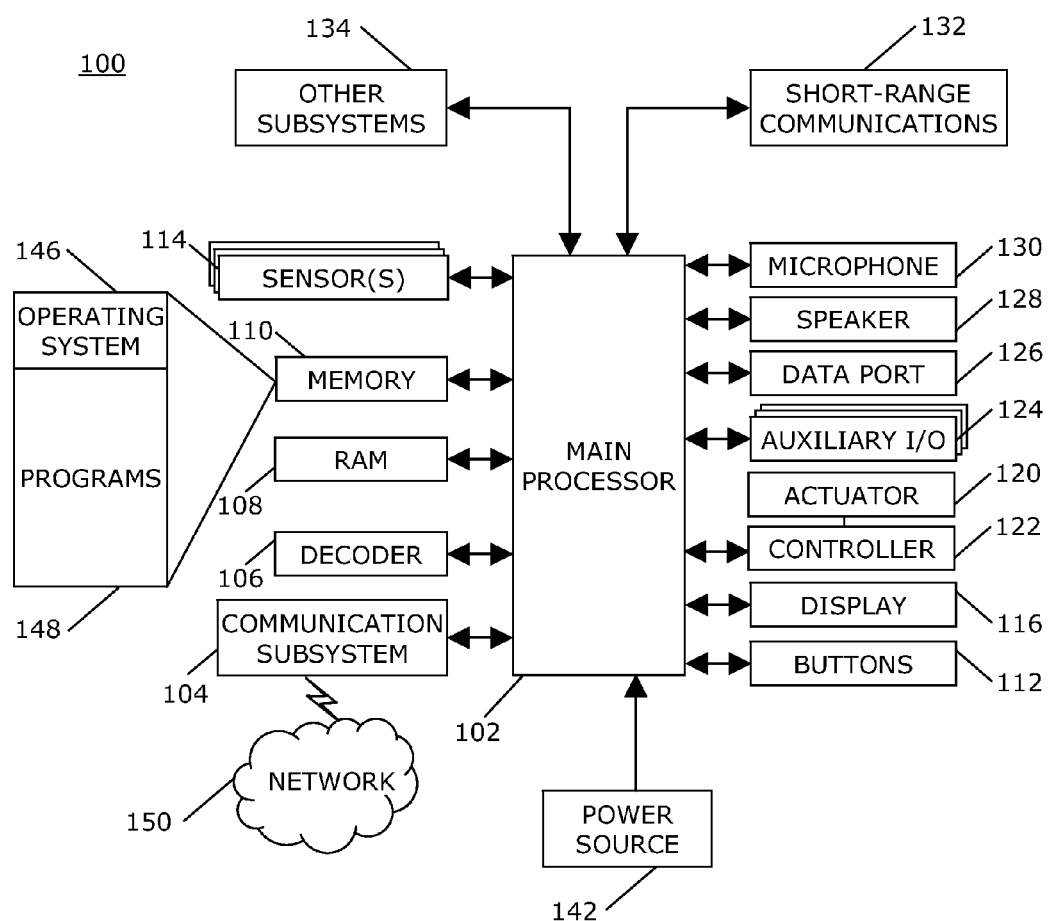
FIG. 1 is a simplified block diagram of components including internal components of a portable electronic device according to an example embodiment.

The following describes an electronic device that includes a base, a membrane coupled to and spaced from the base, an actuator disposed between the base and the membrane, and spaced from the membrane when the actuator is not actuated, and a controller configured to control actuation of the actuator to cause the actuator to contact the membrane.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components including internal components of a portable electronic device according to an example embodiment. The portable electronic device 100, which may be in the form of, for example, a watch, includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a power source 142 such as a rechargeable battery or batteries.

The processor 102 also interacts with additional subsystems such as a Random Access Memory (RAM) 108, memory 110, buttons 112, sensors 114, a display 116, an actuator 120, an auxiliary input/output (I/O) subsystem 124, a data port 126, a speaker 128, a microphone 130, short-range communications 132 and other device subsystems 134. User-interaction with the graphical user interface of the portable electronic device 100 is performed through the buttons 112 and the sensors 114. The processor 102 may interact with the actuator 120 through a controller 122. The processor 102 may interact with the sensors 114 via an electronic controller. Information, such as text, characters, symbols, images, icons, and other items that may be displayed or rendered on a portable electronic device, is displayed on the display 116 via the processor 102.

To identify a subscriber for network access according to the present embodiment, the portable electronic device 100 may use a Subscriber Identity Module or a Removable User Identity Module (SIM/RUIM) card for communication with a network such as the wireless network 150. Alternatively, user identification information may be programmed into memory 110.

The portable electronic device 100 includes an operating system 146 and software programs or components 148 that are executed by the processor 102 and are typically stored in a persistent, updatable store such as memory 110. Additional applications or programs may be loaded onto the portable electronic device 100 through the wireless network 150, the auxiliary I/O subsystem 124, the data port 126, the short-range communications subsystem 132, or any other suitable subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The sensors 114 may be any suitable sensors such as capacitive sensors including a capacitive sensor layer or layers of suitable material such as indium tin oxide (ITO). The sensors 114 may be located on a periphery of the face of the portable electronic device 100, as illustrated in the front view of the portable electronic device shown in FIG. 2. One or more touches, on the touch sensors, also known as touch contacts or touch events, may be detected. A location of the touch may be determined based on the sensor at which the touch is detected. A signal is provided to the controller 116 in response to detection of a touch. A touch may be detected from any suitable object, such as a finger or thumb. The electronic controller, through which the sensors interact with the processor 102, and/or the processor 102 may detect a touch and multiple simultaneous touches may be detected.

Figure 2:
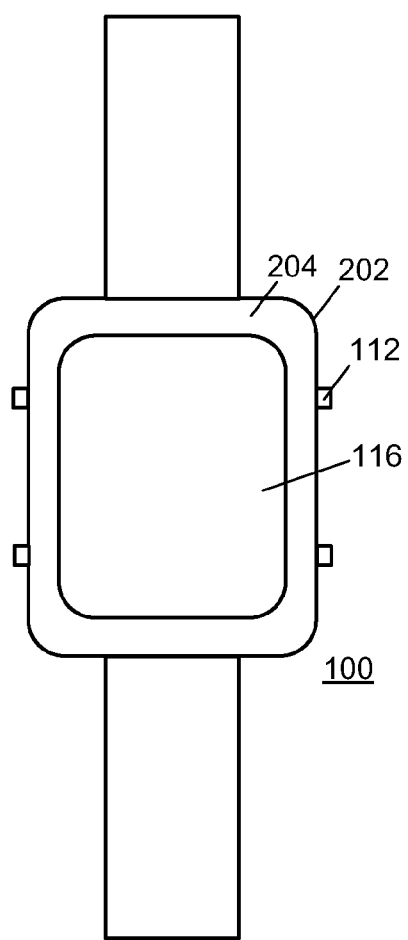
FIG. 2 is a front view of an example of a portable electronic device.
Figure 3:
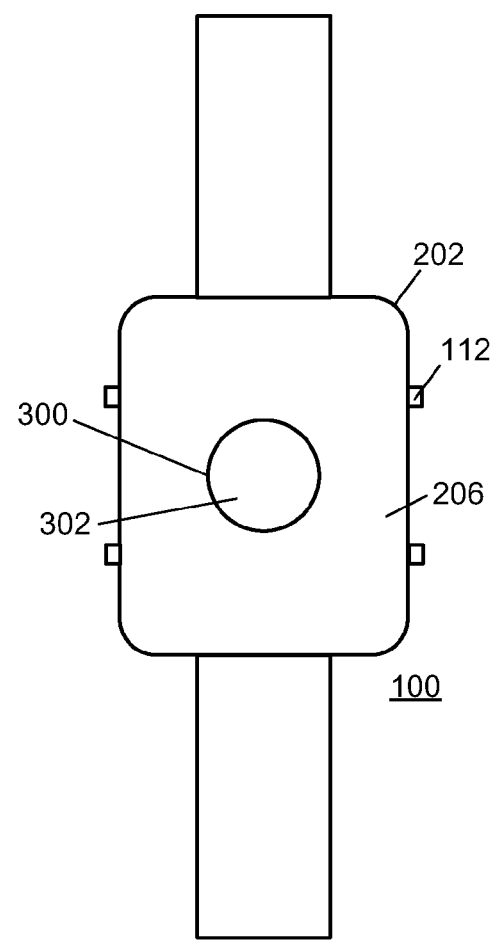
FIG. 3 is a back view of an example of a portable electronic device.

Referring to FIG. 2 and FIG. 3, a front view and back view of the portable electronic device 100, which in the present embodiment is in the shape of a watch and is normally worn at or near the wrist of a user, are shown. The portable electronic device 100 includes a housing 202 that houses the internal components shown and described above with reference to FIG. 1. The housing 202 includes a front frame 204 and a back 206, joined by sidewalls that extend between the front frame 204 and the back 206. The housing 202 may be made of any suitable material such as, for example, a high density plastic. The front frame 204 frames the display 116 and the sensors 114 (shown in FIG. 1) are distributed around the front frame 204.

In the example shown in FIG. 2 and FIG. 3, four buttons 112 extend from two opposing sidewalls, although any suitable number of buttons may be utilized. Alternatively, the portable electronic device 100 may be without such buttons.

The back 206 of the portable electronic device 100 includes an opening through which a cover 302 of an actuator assembly 300 is exposed. In the present example, the opening is circular and the actuator assembly 300 is disposed in the opening such that an outer surface of a cover of the actuator assembly 300, is generally flush with the remainder of the back 206 of the portable electronic device 100. Alternatively, the cover may extend across the entire back of the portable electronic device 100 rather than at an opening in the back.

Figure 4:
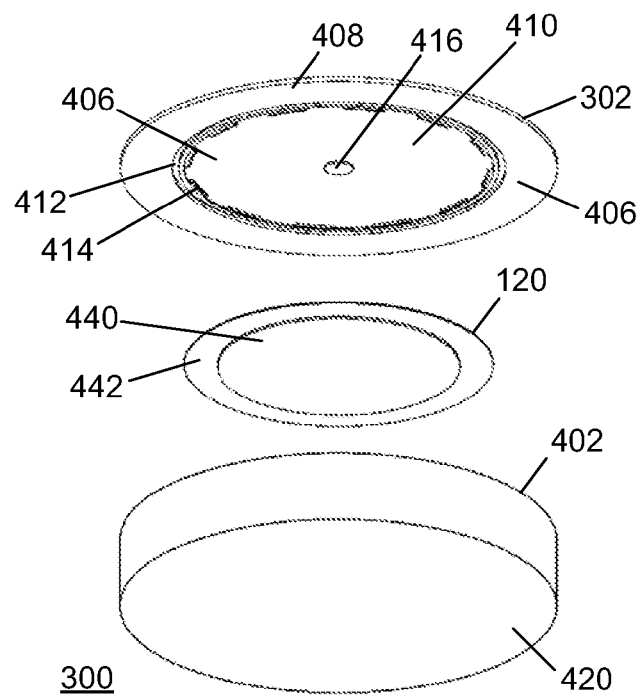
FIG. 4 is an exploded view of an example actuator assembly of the portable electronic device in accordance with an example embodiment.
Figure 5:
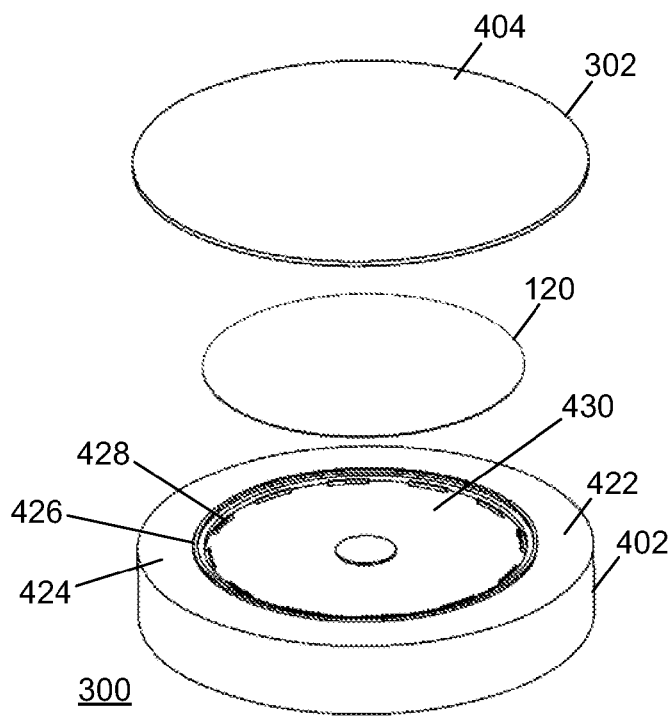
FIG. 5 is another exploded view of the example actuator assembly of the portable electronic device.

FIG. 4 and FIG. 5 show exploded perspective views of the actuator assembly 300, including the cover 302, the actuator 120, and a base 402. As described, the cover 302 is exposed at the back 206 of the housing 202 (shown in FIG. 3) of the portable electronic device 100. The cover 302 is supported by and coupled to the base 402. The actuator 120 is disposed between the base 402 and the cover 302.

The cover 302 is generally planar on the outer surface 404, which is exposed at the back 206 of the housing 202 (shown in FIG. 3). Alternatively, the cover 302 is shaped, for example, to fit or curve around a wrist. The inner surface 406 is shaped to provide support and flexibility. The inner surface 406 of the cover 302 includes a peripheral rim 408 that is thick to provide support for a flexible membrane 410 which is centered within and coaxial with the rim 408. The rim 408 includes a groove 412 that extends around the rim 408 to mate with a cylindrical projection from the base 402. A plurality of spaced apart raised lips 414 on the inner surface 406, extend around the margin of the membrane 410. A cylindrical protrusion 416 extends from a center of the membrane 410 on the inner surface 406. The membrane 410 is thin compared to the rim 408, the raised lips 414 and the cylindrical protrusion 416, to facilitate elastic deformation of the membrane 410, for example, when a force is imparted to the cylindrical protrusion 416. The cover 302 is greater in thickness at the cylindrical protrusion 416 than at the remainder of the membrane 410 to provide a reinforced area at which the actuator strikes the cover 302.

The base 402 is generally planar on an outer surface 420, on an opposite side of the base 402 as the cover 302. The inner surface 422 includes a peripheral rim 424 that includes a tongue 426 that protrudes from and extends around an interior edge of the peripheral rim 424. The tongue 426 is sized and shaped to mate with the groove 412 of the cover 302. A plurality of spaced apart teeth 428 extend around the margin of a tray 430 which is centered within a coaxial with the rim 424. The teeth 428 are sized, shaped, and located to cooperate with the raised lips 414 of the cover 302 and spaced therefrom, to clamp the actuator 120 therebetween. The base 402 is sized to support the actuator 120 and the cover 302, and is supported within the housing 202 of the portable electronic device 100. Alternatively, the base 402 may be incorporated into the housing.

The actuator 120 includes a piezoelectric disk 440 such as a PZT ceramic disk adhered to a metal substrate 442 of larger diameter than the piezoelectric disk 440 for bending when the piezoelectric disk 440 contracts diametrically as a result of build up of charge across the piezoelectric disk 440. The actuator 120 is electrically connected to a piezo driver that communicates with the controller 122. The controller 122 may be a microcontroller that communicates with the processor 102. Alternatively, the processor 102 may control the actuator 120. The controller 122 controls the piezo driver that controls the current/voltage to the piezoelectric disk 440 of the actuator 120. When the charge is reduced by a discharge current/voltage, the actuator 120 returns to the state in which the actuator is not actuated, i.e., the actuator 120 is not bent.

Figures 6, 7:
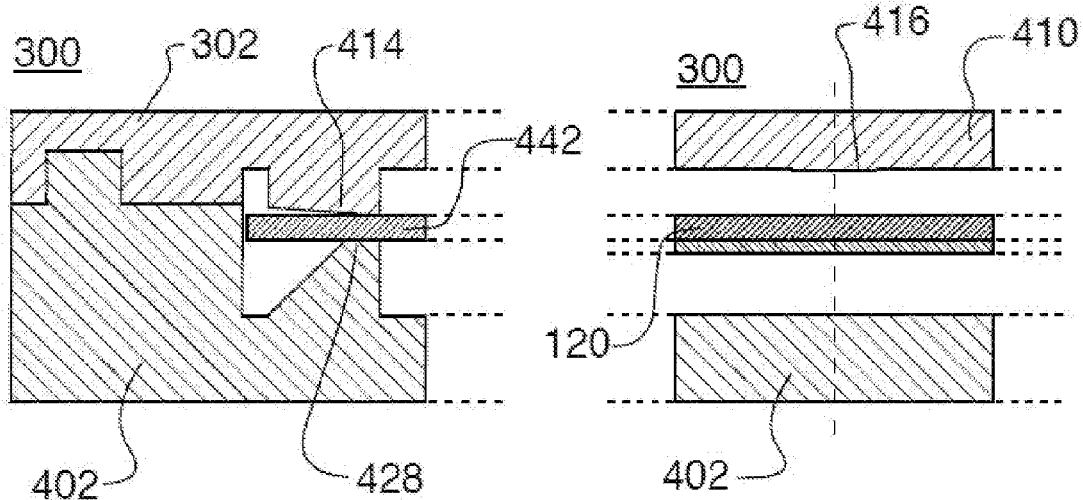
FIG. 6 is a partial sectional view at an edge of the actuator assembly, when the actuator is not actuated.
FIG. 7 is a partial sectional view at a center of the actuator assembly, when the actuator is not actuated.
Figures 8, 9:
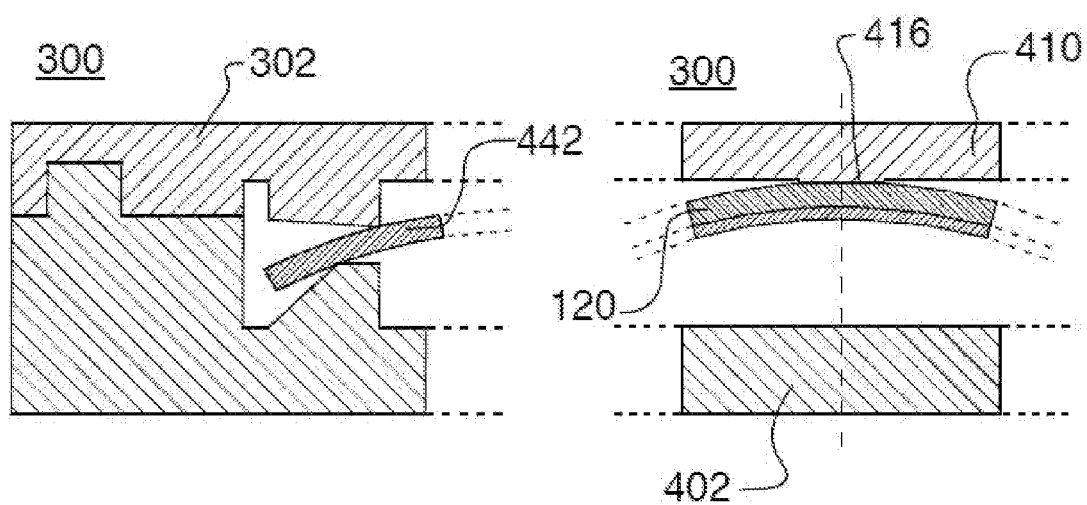
FIG. 8 is a partial sectional view at an edge of the actuator assembly, when the actuator is actuated.
FIG. 9 is a partial sectional view at center of the actuator assembly, when the actuator is actuated.

Reference is now made to FIG. 6 and FIG. 7, which show partial sectional views at an edge of the actuator assembly 300 and a center of the actuator assembly 300, respectively. The membrane 410 is spaced from the base 402. The metal substrate 442 of the actuator 120 is disposed between the teeth 428 of the base 402 and the raised lips 414 of the cover 302 such that the actuator is spaced from the membrane 410 when the actuator 120 is not actuated, as illustrated in FIG. 7. Referring now to FIG. 8 and FIG. 9, which show partial sectional views of one side of the actuator assembly 300 and a center of the actuator assembly 300, respectively, when the actuator 120 is actuated. The current/voltage to the actuator 120 is controlled by the controller to increase the charge across the piezoelectric disk 440 of the actuator 120 and thereby actuate the actuator 120 over a very short period of time. The actuator 120 bends when the charge across the piezoelectric disk increases and the actuator 120 strikes the cylindrical protrusion 416 in the center of the membrane 410.

Figure 10:
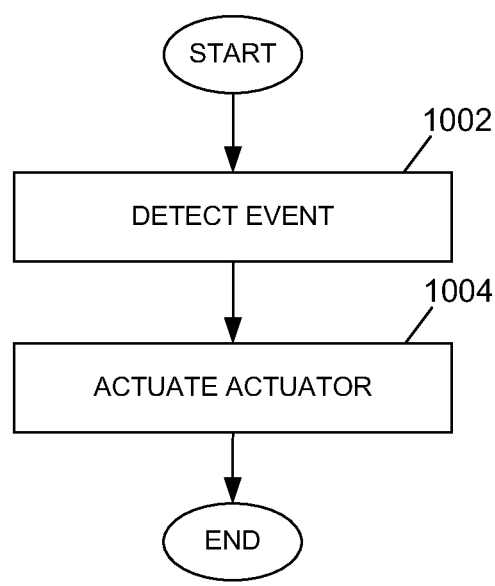
FIG. 10 is a flowchart illustrating an example of a method of controlling a portable electronic device.

A flowchart illustrating a method of controlling the portable electronic device 100 is shown in FIG. 10. The method may be carried out by software executed, for example, by the processor 102 in communication with the controller of the actuator 120. Coding of software for carrying out such a method is within the scope of a person of ordinary skill in the art given the present description. The method may contain additional or fewer processes than shown and/or described. An event is detected at 1002 and the actuator is actuated at 1004 to provide, for example, a notification of the event for the user. The event may be, for example, receipt of an email, text message, an instant message, or any other suitable message. The event may also be a calendar event reminder, and alarm, or any other suitable reminder at the portable electronic device 100. The event may also be receipt of a query by user-interaction with the portable electronic device 100, for example, to request an indication of the number of unopened emails. In response, the controller determines the number and responds by communicating with the controller to actuate the actuator the same number of times.

When the portable electronic device 100 is worn on or near the wrist of the user, actuation of the actuator 120 provides tactile output in the form of, for example, a pulsation or beat, as the membrane 410 is deflected when the actuator 120 strikes the membrane 410.

In the above-described example, the portable electronic device 100 is a PDA and includes features and functions of a PDA. In another example embodiment, the portable electronic device may function without a display. For example, the device may not have any display or, alternatively, may include an analog watch face and components of an analog watch. In another example embodiment, the electronic device may function without the sensors.

In alternative examples, the portable electronic device may include more or fewer functions and features.

Alternatively, the portable electronic device may include short-range communication capabilities only, for communicating with a handheld electronic communication device. In this example, the portable electronic device communicates with the handheld electronic communication device and provides a peripheral display for displaying information from the handheld electronic communication device. In this example, detection of an event may include receipt of data from the handheld electronic communication device such as a total number of unopened emails.

Advantageously, tactile output is provided from a portable electronic device in contact with the skin of a user to provide information to the user without requiring viewing of a display. Such information may be useful, for example, when a user is in a meeting, driving a vehicle, or in any other instance in which viewing of a display is difficult, dangerous, or disruptive. The provision and control of tactile output in touch-sensitive devices is desirable.

An electronic device includes a base, a membrane coupled to and spaced from the base, an actuator disposed between the base and the membrane, and spaced from the membrane when the actuator is not actuated, and a controller configured to control actuation of the actuator to cause the actuator to contact the membrane.

A method of controlling an electronic device includes detecting an event, and actuating an actuator disposed between a base and a membrane, to cause the actuator to strike the membrane to provide tactile output in response to detecting the event.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. An electronic device comprising:
   a base;
   a membrane coupled to and spaced from the base;
   an actuator disposed between the base and the membrane, and spaced from the membrane when the actuator is not actuated;
   a controller configured to control actuation of the actuator to cause the actuator to contact the membrane by moving the actuator from a first state in which the actuator is out of contact with the membrane, to a second state in which the actuator is in contact with the membrane,
   a processor connected to the controller; and
   a short-range communication device connected to the processor to communicate with a handheld electronic communication device;
   wherein the electronic device is configured to be worn one of at a wrist and near a wrist,
   wherein the membrane is disposed through an opening in a back of the electronic device such that, when the electronic device is worn, the membrane contacts the skin of the user when the actuator is actuated for tactile output, and
   wherein the membrane comprises an elastically deformable sheet of plastic.

2. The electronic device according to claim 1, wherein the actuator comprises a piezoelectric actuator.

3. The electronic device according to claim 2, wherein the piezoelectric actuator is actuated by the controller.

4. The electronic device according to claim 1, wherein the actuator strikes the membrane when actuated.

5. The electronic device according to claim 1, wherein the electronic device is a watch.

6. The electronic device according to claim 1, comprising a display on a front of the electronic device.

7. The electronic device according to claim 1, wherein the membrane comprises a protrusion extending from a center of the membrane, and wherein the actuator is arranged to contact the protrusion of the membrane when actuated by the controller.

8. The electronic device according to claim 1, wherein an outer surface of the membrane is generally flush with the back of the electronic device.

9. A method of controlling an electronic device, comprising:
   communicating with a handheld electronic communication device via a short-range communication device connected to a processor of the electronic device;
   detecting an event;
   actuating an actuator disposed between a base and a membrane, to cause the actuator to move from a first state in which the actuator is out of contact with the membrane, to a second state in which the actuator is in contact with the membrane, to thereby strike the membrane to provide tactile output in response to detecting the event,
   wherein the electronic device is configured to be worn one of at a wrist and near a wrist,
   wherein the membrane is disposed through an opening in a back of the electronic device such that, when the electronic device is worn, the membrane contacts the skin of the user when the actuator is actuated for tactile output, and
   wherein the membrane comprises an elastically deformable sheet of plastic.

10. The method according to claim 9, wherein the event comprises receipt of a notifier at the electronic device.

11. The method according to claim 10, wherein the notifier comprises a notification of receipt of an email or a calendar reminder.

12. The method according to claim 9, comprising receiving a query at the electronic device.

13. The method according to claim 9, wherein detecting the event comprises receiving data from a handheld electronic communication device.

14. The method according to claim 9, wherein the membrane comprises a protrusion extending from a center of the membrane, and wherein actuating the actuator causes the actuator to strike the protrusion of the membrane.

* * * * *